United States Patent [19]

Achiha et al.

[11] Patent Number: 4,739,390
[45] Date of Patent: Apr. 19, 1988

[54] TELEVISION SIGNAL PROCESSING CIRCUIT

[75] Inventors: Masahiko Achiha, Iruma; Isao Nakagawa, Yokohama; Kazuo Ishikura, Hachioji; Shobu Saito, Yokohama, all of Japan

[73] Assignee: Hitachi, Ltd., Tokyo, Japan

[21] Appl. No.: 895,841

[22] Filed: Aug. 12, 1986

[30] Foreign Application Priority Data

| Aug. 30, 1985 | [JP] | Japan | 60-189656 |
| Aug. 30, 1985 | [JP] | Japan | 60-189657 |
| Jan. 29, 1986 | [JP] | Japan | 61-15636 |

[51] Int. Cl.$^4$ .................. H04N 9/64; H04N 9/77
[52] U.S. Cl. ........................................ 358/11; 358/31
[58] Field of Search .............. 358/11, 12, 31, 320, 358/327

[56] References Cited

U.S. PATENT DOCUMENTS

| 4,530,004 | 7/1985 | Achiha | 358/31 |
| 4,626,891 | 12/1986 | Achiha | 358/11 |
| 4,636,841 | 1/1987 | Moles | 358/31 |
| 4,658,285 | 4/1987 | Lewis | 358/31 |

Primary Examiner—Michael A. Masinick
Attorney, Agent, or Firm—Antonelli, Terry & Wands

[57] ABSTRACT

A television signal processing circuit which separates a television signal into a luminance signal and a chrominance signal or interpolates the scanning lines of the television signal by using a video memory such as a frame memory or a field memory. The circuit determines whether the television signal to be treated is a standard television signal or a non-standard television signal. Depending upon this determination, the signal processing circuit changes its operation mode so that it operates properly even in case the television signal is different from the standard television signal and contains jitter in the time axis like the signal from a VTR. When the television signal is a non-standard television signal, the processing circuit without the video memory operates.

8 Claims, 6 Drawing Sheets

TELEVISION SIGNAL PROCESSING CIRCUIT

BACKGROUND OF THE INVENTION (1) Field of the Invention

The present invention relates to a television signal processing circuit, and more specifically to a television signal processing circuit that is adapted for processing not only those standard color television signals that are transmitted from the broadcasting stations but also those television signals that are at least partly different in time and phase from the above standard color television signals.

(2) Description of the Prior Art

Owing to the development in the semiconductor integrated circuit technology, delay means (such as frame memory or field memory) having a delay time equal to, or longer than, the vertical scanning period of a television signal has been realized in a small size and at a reduced cost. By utilizing this means, a variety of signal processing circuits have been put into practice.

According to known signal processing systems, color television signals are divided into signals and color difference signals by using a frame memory, or television signals under the interlaced scanning, are interpolated among the scanning lines using a field memory and are converted into successive scanned signals. With the above-mentioned signal processing circuit employing a video memory such as field memory or frame memory having a delay time that is nearly equal to the vertical scanning period of a television signal or nearly equal to an integer number of times thereof, there are obtained output signals of a high quality when the input television signals conform to those of the signals of a standard color television system. In processing the output signals of video tape recorders for domestic use that are now widely used, however, it is difficult to properly process the signals by utilizing the delay of field period or frame period, since these signals are deviated from the standard color television signals. For instance, these signals have large jitters and their color subcarrier frequency is not an integer and a half multiple of the horizontal scanning frequency. In separating a composite signal into a luminance and a color difference signal by using a frame memory, color subcarrier phase difference between frame periods must be 180 degrees. With the video tape recorders for domestic use, however, the signals are not so, and the signals are not properly separated into luminance signals and chrominance signals by inter-frame processing. In the scanning line interpolation using a field memory, furthermore, the field period does not remain constant and interpolation signals are not obtained correctly. Accordingly, if signals of a household video tape recorder are processed by a processing circuit which has such a video memory as a field memory or a frame memory, there are obtained only those signals that are very deteriorated.

SUMMARY OF THE INVENTION

The principal object of the present invention is to provide a signal processing circuit having a video memory which is capable of properly treating not only the standard color television signals but also non-standard color television signals, that are not in conformity with the standard color television signals which have predetermined relationships with regard to the line scanning frequency, the color subcarrier frequency, and the phase.

In order to achieve the above-mentioned object according to the present invention, a first signal processing circuit having a video memory such as field memory or frame memory is arranged in parallel with a second signal processing circuit without video memory, and switching means is provided to select said second signal processing circuit when attempting to process the non-standard color television signals.

According to a preferred embodiment of the present invention, furthermore, an input TV signal containing a synchronizing signal is processed, the synchronizing signal (deflection drive signal) is separated from an output TV signal that is processed by a signal processing circuit which has a delay time between the input TV signal and the output TV signal that is nearly equal to, or greater than, the vertical scanning period, and the output TV signal is displayed on a display device and which is divided by the separated vertical and horizontal synchronizing signals. Thus, the image can be stably displayed even with those TV signals that contain jitter relying only upon a synch-separation circuit on the output side of the signal processing circuit without the need of providing an additional circuit for the synchronizing signals in front of the signal processing circuit.

Further, when a clock signal for driving the signal processing circuit is locked in phase with a particular signal in the blanking period of an input color television signal and when the television signals to be processed are not the standard television signals, the signal processing circuit such as the YC separating circuit or the scanning line interpolation circuit performs the intra-field processing.

A horizontal synchronizing signal or a color burst signal is used or a reference signal of a clock generating circuit.

When the horizontal synchronizing signal is to be utilized, the YC separation must be effected by the intra-field processing. In this case, the motion-adaptive field interpolation can be performed without deterioration.

When a clock signal synchronized in phase with the color burst signal is to be used, both the YC separation and the scanning line interpolation should be effected by the intra-field processing, and the horizontal synchronizing signal for deflecting the color display should be extracted from the double scanned video signals.

The above-mentioned and other features and objects of this invention will become more apparent by reference to the following description taken in conjunction with the accompanying drawings:

DESCRIPTION OF THE PREFERRED EMBODIMENTS

Figure 1:
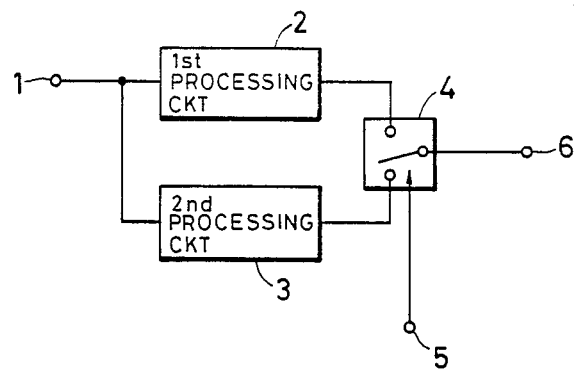
FIGS. 1, 2 and 3 are block diagrams which schematically illustrate the construction of television signal processing circuits according to embodiments of the present invention.

FIG. 1 is a diagram which schematically illustrates the structure of the present invention, wherein a television signal which is input to a terminal 1 and which is to be processed, is input to a first signal processing circuit 2 having a video memory and to a second signal processing circuit 3 without having video memory. As will be described later in detail, the video memory has a delay time which is nearly equal to the vertical scanning period of the television signal or which is nearly equal to an integer number of times thereof.

Outputs of the signal processing circuits are selected by a switching circuit 4. When the signals that are not in conformity with the standard color television signals are to be processed, the switching circuit 4 is controlled by a control signal applied to a terminal 5, whereby the output of the second signal processing circuit 3 is selected. When the input television signal is the standard color television signal, the output of the first signal processing circuit 2 is selected and is sent to an output terminal 6.

Figure 2:
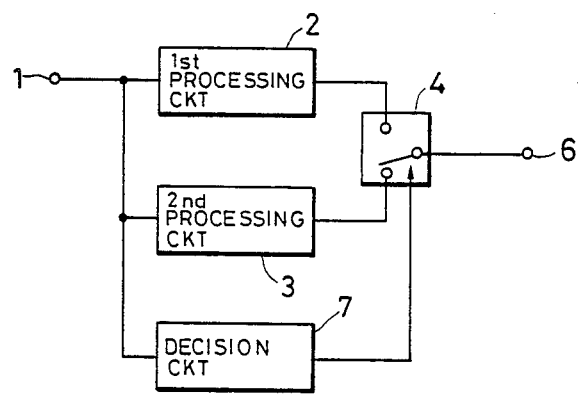

FIG. 2 illustrates an embodiment of the present invention, wherein the first and second signal processing circuits 2, 3, and the switching circuit 4 are the same as those of FIG. 1.

In this embodiment, a television signal to be processed is input to the first and second signal processing circuits, and is further input to a decision circuit 7 which decides whether the signal is the standard color television signal or not. The decision circuit 7 decides whether the signal is in conformity with the standard color television system or not relying upon, if there is established, a predetermined offset relationship between the color subcarrier frequency and the scanning frequency, or relying upon if there is a change in time in the field period or in the frame period. When the decision circuit 7 decides that the signal is not in confirmity with the standard color television system, the switching circuit 4 is controlled by the output signal of the decision circuit 7 so that the output of the second signal processing circuit is obtained from the terminal 6.

Figure 3:
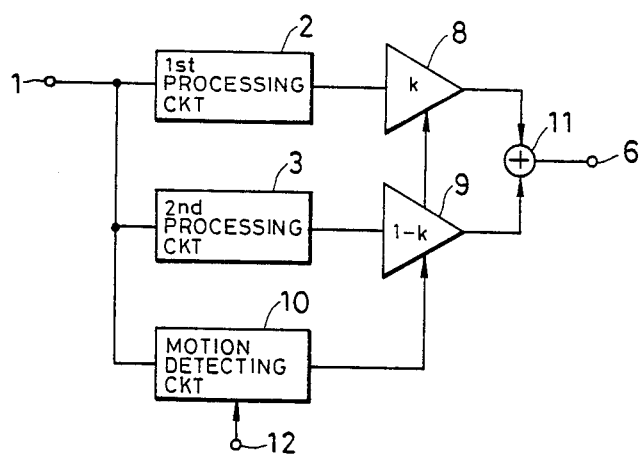

FIG. 3 illustrates another embodiment of the present invention wherein reference numerals 2 and 3 denote first and second signal processing circuits that are the same as those of FIGS. 1 and 2. In this embodiment, outputs of the first and second signal processing circuits 2 and 3 are input to coefficient circuits 8 and 9 where they are multiplied by k times and (1−k) times, respectively, added up together an adder circuit 11, and the resultant output is produced from the terminal 6. Here, symbol k denotes a motion coefficient which varies between 0 and 1 depending upon the presence or absence of motion. A motion detecting circuit 10 extracts motion information that is contained in the television signal and converts it into the motion coefficient k. In a portion of a still picture where there is no motion, the coefficient k approaches 1 and the output signal of the first signal processing circuit which has the video memory occupies an increased ratio. In a moving area where there is a great change, the coefficient k approaches 0 and the output signal of the second signal processing circuit occupies an increased ratio. When the television signal to be processed is not in conformity with the standard color television signal, the motion detecting circuit is controlled by a control signal appearing on the terminal 12, whereby the motion coefficient k is forcibly caused to assume 0, so that the output of the second signal processing circuit 3 is obtained from the terminal 6. Here, the signal appearing on the terminal 12 may be a signal that is manually designated, or a signal that adapts to an input television signal entered through a particular terminal, or an output signal of the decision circuit 7 of FIG. 2. The same also holds true for the signal that is applied to the terminal 5 of FIG. 1.

Figure 4:
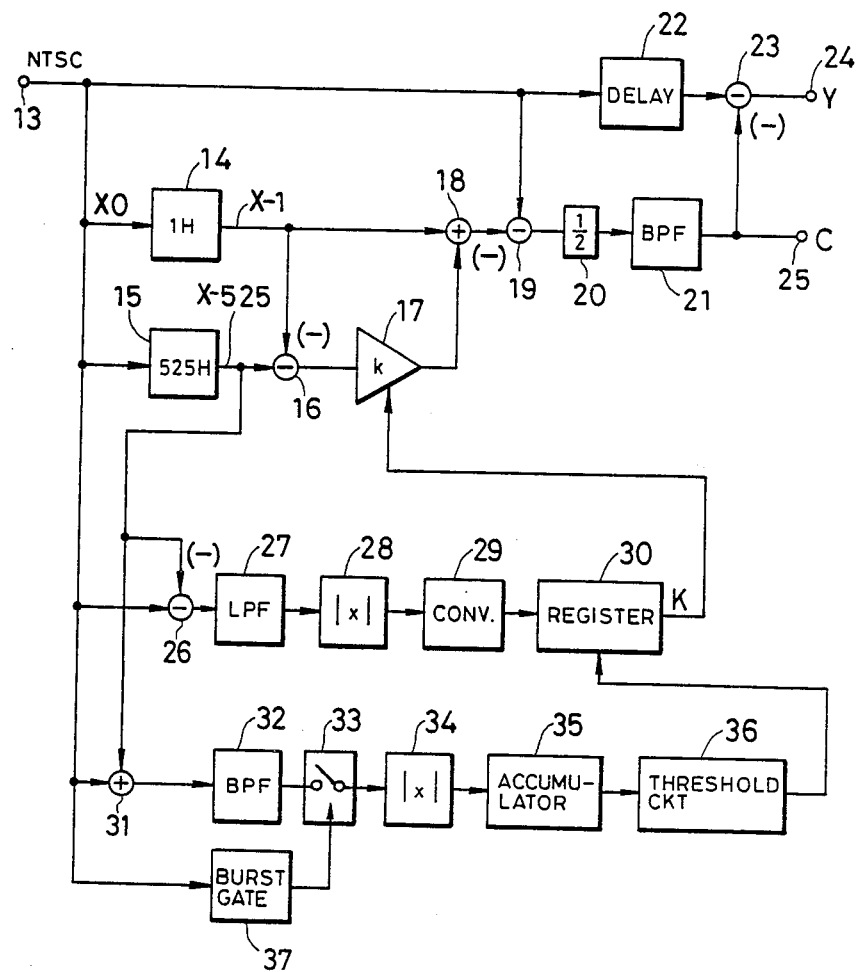
FIG. 4 is a diagram of a further embodiment in which the processing circuits of FIG. 3 consist of YC separating circuits.

FIG. 4 is a block diagram which more specifically illustrates the embodiment of FIG. 3 and in which the present invention is adapted to a motion-adaptive YC separating circuit which separates a color television signal of the NTSC system into a luminance signal Y and a modulated chrominance signal C by using a frame memory and a line memory.

In the color television signal of the NTSC system, the polarity of the modulated chrominance signal C is inverted after every horizontal scanning period H, and the polarity of the modulated chrominance signal C is also inverted relative to the signal of a scanning line on the same position on the screen one frame before which is delayed by one frame (525 H). If the input television signal is denoted by $X_0$, a signal which is delayed by 1 H by the line memory is denoted by $X_{-1}$, and a signal which is delayed by 525 H by the frame memory is denoted by $X_{-525}$, a modulated chrominance signal $C_1$ is extracted by the first signal processing circuit as expressed by, $$C_1 = \frac{X_0 - X_{-525}}{2} \cdot H_{BPF} \qquad (1)$$

where $H_{BPF}$ denotes transmission characteristics of a band-pass filter which extracts signals in the modulated chrominance signal band.

The second signal processing circuit, on the other hand, extracts the modulated chrominance signal $C_2$ as expressed by, $$C_2 = \frac{X_0 - X_{-1}}{2} \cdot H_{BPF} \qquad (2)$$

By modifying the equations (1) and (2) in the following manner, therefore, a desired modulated chrominance signal C is obtained as, $$\begin{aligned} C &= k \cdot C_1 + (1-k) C_2 \\ &= k \cdot \frac{X_0 - X_{-525}}{2} \cdot H_{BPF} + (1-k) \cdot \frac{X_0 - X_{-1}}{2} \cdot H_{BPF} \\ &= \frac{X_0 - [(X_{-525} - X_{-1}) \cdot k + X_{-1}]}{2} \cdot H_{BPF} \end{aligned} \qquad (3)$$

by mixing the modulated chrominance signals $C_1$ and $C_2$ together with the coefficient k.

In FIG. 4, the equation (3) is specifically calculated to find a modulated chrominance signal which is then subtracted from the NTSC signal to obtain a luminance signal Y. That is, an NTSC signal $X_O$ appearing on the input terminal 13 is delayed by 1 H through the line memory 14 to obtain the signal $X_{-1}$, and is delayed by 525 H through the frame memory 15 to obtain the signal $X_{-525}$. Outputs of the line memory 14 and the frame memory 15 are subtracted from each other through a subtracting circuit 16, the subtracted result is multiplied by k times through a coefficient circuit 17, and is added to the output of the line memory 14 through an adder circuit 18, thereby to carry out the arithmetic operation of a portion of parenthesis [ ] in the equation (3). In a subtracting circuit 19, therefore, the output of the adder circuit 18 is subtracted from the input signal $X_O$, and the subtracted circuit is halved through a coefficient circuit 20 and is input to a band-pass filter 21. Then, if only the components of the modulated chrominance signal band are extracted by the band pass filter 21, is there obtained a desired modulated chrominance signal C as calculated in accordance with the equation (3). Furthermore, a desired luminance signal Y which is processed to be adapted to the motion is obtained by subtracting the modulated chrominance signal C through a subtracting circuit from a signal that is obtained by delaying the input NTSC signal through a delay circuit 22 by a time equal to an operation delay time of the band-pass filter 21.

According to this embodiment, a frame difference signal is obtained through a subtracting circuit 26, and a low-frequency component thereof is extracted through a low-pass filter 27. An absolute value of the low-frequency component through an absolute value circuit 28 represents the motion information in the television signal which is proportional to the luminance change between the frame period.

The motion information is converted by a converter circuit 29 constituted by a read-only memory (ROM) or the like, and thus a motion coefficient k is obtained on a register 30.

If a video signal on the input terminal 13 is the one sent from a household video tape recorder, the signal contains jitter due to mechanical change in time of the VTR. Therefore, a phase relationship of opposite polarities with respect to a signal of one preceding frame is no longer correctly maintained. Hence, an added signal between frames is observed in a burst portion. If there is no signal, it is an indication that a signal is in conformity with the standard color television system of NTSC. If the added signal is greater than a threshold value, it is not in conformity therewith, from which it can be discerned that the signal is the one sent from a household VTR. In the embodiment of FIG. 4, the added signal between the frames is calculated by an adder circuit 31 and is input to a band-pass filter 32 to extract the components of subcarrier signals. Then a gate circuit 33 gates a burst portion only from a gate signal obtained by an extracting circuit 37 which extracts a gate signal that indicates a period of burst signal among the input signals. An absolute value thereof is then found by an absolute value circuit 34 and is accumulated during a burst period by an accumulator 35. The accumulated value is then compared by a threshold circuit 36 with a predetermined threshold value. If there is detected a signal greater than the threshold value, the register 30 is reset, and the motion coefficient k is forcibly caused to assume 0. Thus, the operation of YC separation can be realized as intra-fied processing circuit without using the output of the frame memory.

Figure 5:
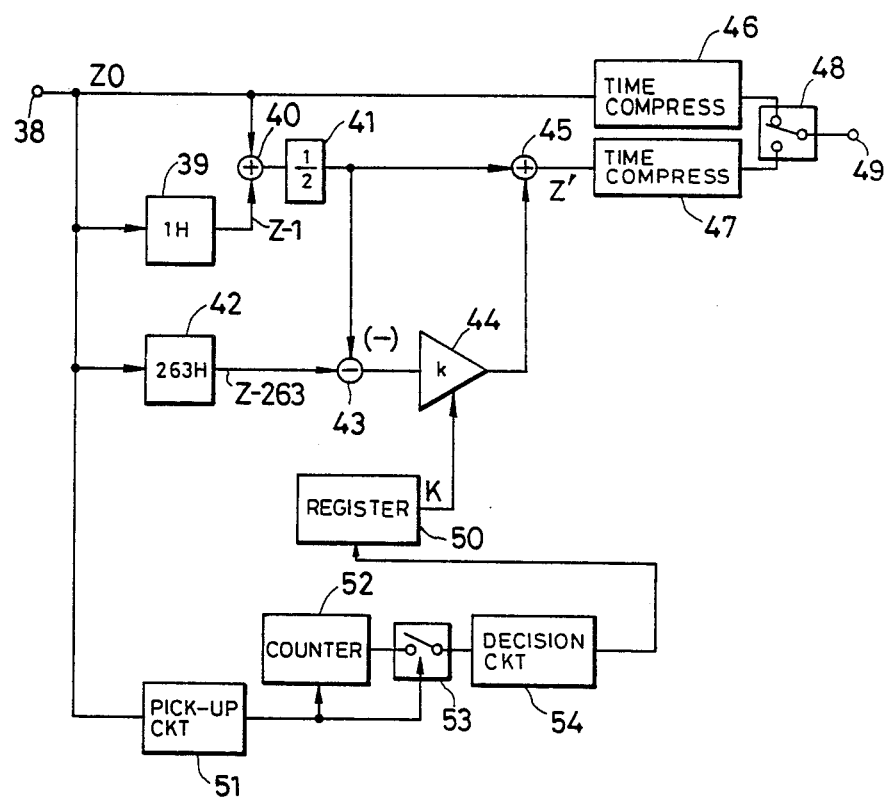
FIG. 5 is a diagram of a still further embodiment in which the processing circuits of FIG. 3 consist of scanning line interpolation circuits.

FIG. 5 is a diagram which illustrates the circuit of FIG. 3 according to a further embodiment of the present invention in which the present invention is adopted to a signal processing circuit that converts the interlaced-scanned television signal into successive scanned television signals by using the motion adoptive line interpolation. In FIG. 5, the interlaced television signal during the interlaced input to the terminal 38 is further input to the line memory 39 that delays it by 1 H and to the field memory 42 that delays it by 263 H. Relative to the present signal $Z_O$, a signal $Z'$ of an interpolated scanning line just over thereof on the screen is found through the following motion-adaptive calculation. That is, the first signal processing circuit prepares an interpolated signal $Z'_1$ relying upon a signal $Z_{-263}$ of a previous field delayed by 263 H on a scanning line of the same position, i.e., $$Z'_1 = Z_{-263} \quad (4)$$

In the second signal processing circuit, on the other hand, an interpolated signal $Z'_2$ is prepared relying upon an average value of the present signal $Z_O$ and a signal $Z_{-1}$ delayed by 1 H, i.e., $$Z'_2 = \frac{Z_0 + Z_{-1}}{2} \quad (5)$$

The interpolated signal $Z'$ to be found is found by mixing $Z'_1$ and $Z'_2$ together with the motion coefficient k that was explained in the embodiment of FIG. 4, i.e., $$\begin{aligned} Z' &= kZ'_1 + (1-k)Z'_2 \\ &= k\left(Z_{-263} - \frac{Z_0 + Z_{-1}}{2}\right) + \frac{Z_0 + Z_{-1}}{2} \end{aligned} \quad (6)$$

In FIG. 5, an adder circuit 40, a one-half coefficient circuit 41, a subtracting circuit 43, a coefficient circuit 44, and an adder circuit 45 perform the arithmetic operation in accordance with the equation (6) being controlled by the motion coefficient k that appears on a register 50, thereby to obtain the interpolated signal $Z'$. The signal $Z_O$ of the present scanning line and the signal $Z'$ of the interpolating scanning line are comressed for their time axes into one-half by time compressing circuits 46 and 47. The switching circuit 48 is switched to a scanning line unit of which the time is compressed, whereby there is obtained from the terminal 49 the signals having a horizontal scanning period which is reduced to one-half, the signals successively scanning the whole scanning lines during the field period of the input television signals.

When a television signal input through the terminal 38 is the one sent from a household VTR having jitter in the time axis, i.e., a non-standard television signal, the register 50 is reset and the motion coefficient is forcibly caused to assume 0, so that a signal of average line interpolation is obtained as an interpolated signal. According to this embodiment, presence or absence of the change in time axis is determined as described below. Namely, a start signal in the vertical synchronization of television signal $Z_O$ is extracted by a pick-up circuit 51, the period of vertical synchronizing signals is measured by a counter 52 which operates on clock signals of a sampling frequency, and the measured value of the vertical scanning period is supplied from a gate circuit 53 to a decision circuit 54 which renders the decision that the signal is in conformity with the standard television system when the measured value is equal to a predetermined value. When it is not equal to the predetermined value, the decision circuit 54 decides that the signal has a large change in time axis which is not in conformity with the standard system, and resets the register 50.

The decision method of the embodiment of FIG. 5 can also be adopted to monochromatic television signals and color television signals of other systems (such as signals obtained by time-compressing the component signals and color difference signals and time-multiplexing them upon luminance signals) in addition to the color television signals of the standard system such as NTSC system.

When it is decided that the signal does not conform to the standard system as a result of decision by the decision circuit of the embodiment of FIG. 4 and the decision circuit of the embodiment of FIG. 5 that are arranged in parallel with each other, the second intra-field signal processing circuit should be employed in order to realize a signal processing circuit that can cope with a wide range of signal sources.

As will be obvious from the structure of the embodiment, the first and second signal processing circuits share their common portions, and only those portions that are substantially different are placed in parallel to simplify the circuit. However, the specific structure need not be limited to this embodiment only.

The embodiments of FIGS. 2, 4 and 5 are provided with a decision circuit to automatically decide whether the input television signals are in conformity with the standard system or not. However, it is also allowable to provide a plurality pairs of input terminals to so decide that a signal input to particular terminals is the one that is not in conformity with the standard system, or a switching signal may be manually applied from the external side.

As a specific example of the signal processing circuit having video memory, the present invention has dealt with the YC separating circuit and a circuit for converting the interlaced scanning signal into the successive scanning signals. The present invention, however, is in no way limited thereto only but can be adopted to coding apparatuses for interframe coding and inter-field coding, as well as to general signal processing circuits having video memory such as noise-removing circuits in general.

Though the embodiments (FIGS. 4 and 5) of the present invention have dealt with television signals of the NTSC system, it will be obvious that the invention can be adopted to any other system (such as PAL, SECAM, or the like).

Figure 6:
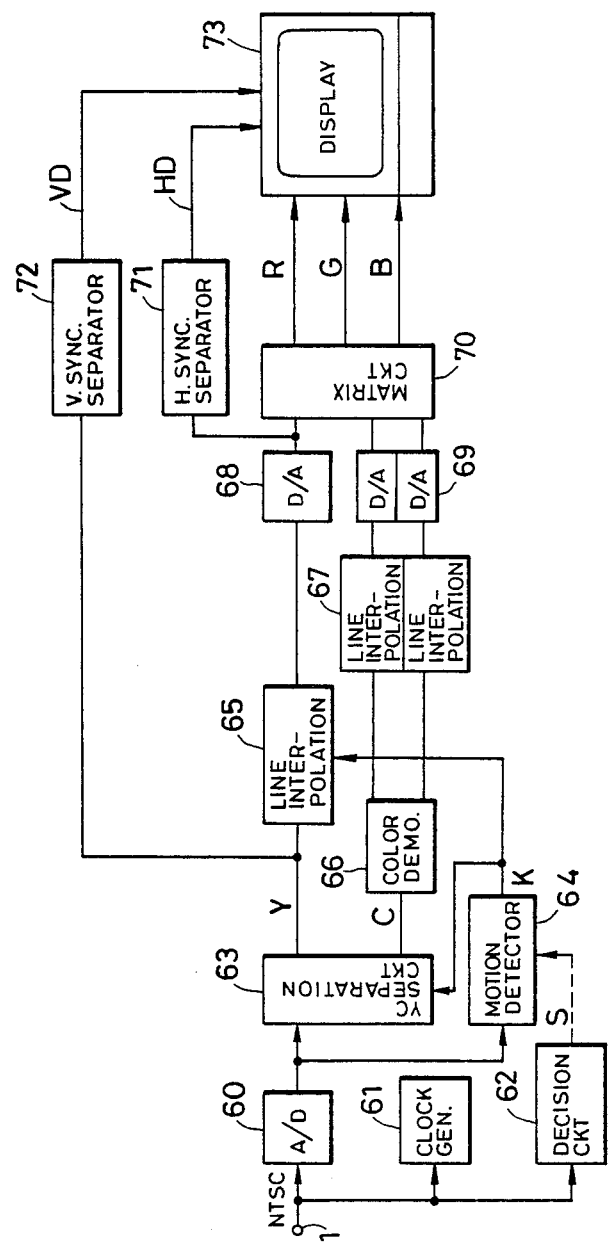
FIGS. 6 and 7 are diagrams of color television receivers to which the present invention is adapted.

FIG. 6 is a block diagram illustrating the structure of a color television signal processing circuit according to a further embodiment of the present invention.

In FIG. 6, composite color television signals of the NTSC system input to an input terminal 1 are digitized through an analog-to-digital converter. The input NTSC-system television signals are also input to a clock generator 61 which produces clock signals of which the phase is locked to color burst signals of the input NTSC signals, the clock signals being supplied to the analog-to-digital converter 60 and the like. Output of the analog-to-digital converter 60 is input to a motion-adaptive YC separating circuit 63 which utilizes the frame memory and the line memory, and to a motion detecting circuit 64. The separated luminance signals Y are input to a motion-adaptive scanning line interpolation circuit 65 which utilizes the field memory and the line memory, and are converted into successive double scanned signals. The separated modulated color signals C are demodulated by a demodulating circuit 66 into color difference signals, and are converted into double scanned successive scanning signals by a scanning line interpolation circuit 67 which utilizes the line memory. The obtained successive scanning signals are returned back to analog signals through digital-to-analog converters 68, 69, converted through a matrix circuit 70 into signals of three primary colors (red R, green G and blue B), and are input to a display device 73.

Further, horizontal synchronizing signals HD are separated by a horizontal synchronizing signal separating circuit 71 from the outputs of the digital-to-analog converter 68 after the double scanning, and are input to the display device 73.

A vertical synchronizing signal separating circuit 72 separates a vertical synchronizing signal VD from the Y signal that is separated by the YC separating circuit 13, and supplies it to the display.

In the above-mentioned embodiment, the motion-adaptive YC separating circuit 63, scanning line interpolation circuit 65, motion detecting circuit 64, and decision circuit 62 that decides whether the input television signals are standard or non-standard television signals, are the same as those circuits used in the embodiments of FIGS. 4 and 5.

The non-standard signals can be discriminated (1) by the above-mentioned method which forcibly assumes the non-standard signal mode relying upon the manual operation, (2) by a method which is provided with input terminals for exclusively receiving non-standard signals, and which assumes the non-standard signal mode when a signal is input thereto, and (3) by a method which monitors a synchronizing signal in the input color television signals and which assumes the non-standard signal mode when the phase changes between the frames (or concretely speaking, when the number of clocks of the frame period is different from a predetermined number of clocks), or a method which monitors an added signal between the lines of a color burst portion and which, when a signal of a color subcarrier wave component is greater than a predetermined value indicating that there no more exist offset relationship, determines the presence or absence of the signal and uses it as a decision signal. The decision circuit 62 of FIG. 6 corresponds to the above-mentioned method (3).

The signal is delayed in the YC separating circuit 63 or in the scanning line interpolation circuit 65 due to the processing. Therefore, time deviation develops between a video signal and a synchronizing signal if the synchronizing signal (particularly, the horizontal synchronizing signal) that, drives the display monitor 14, is picked up from the input color television signals and is supplied to the monitor 73. Deviation does not affect the reproduced picture when the standard signals without jitter in time are being input. When non-standard signals are being input, on the other hand, the deviation is accompanied by the jitter in time and results in the swing of picture in the right and left directions. To avoid this according to the embodiment of FIG. 6, the analog-to-digital converter 60 digitizes the signals inclusive of the synchronizing signals, and the horizontal synchronizing signal separating circuit 71 separates horizontal synchronizing signals HD from the output signals of the digital-to-analog converter 68 after they have been double scanned, in order to drive the display monitor 73. Therefore, the video signals and the horizontal synchronizing signals supplied to the display monitor have the same jitter in time. Thus, this jitter change is cancelled, and a picture is reproduced correctly.

Figure 7:
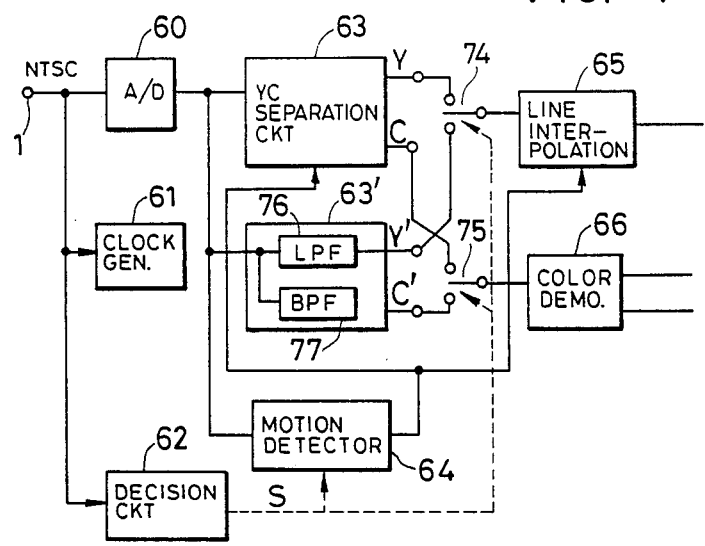

FIG. 7 is a diagram illustrating the structure of the YC separating circuit in the television signal processing circuit according to a further embodiment of the present invention, wherein portions that correspond to those of FIG. 6 are denoted by the same reference numerals.

This embodiment is particularly effective when a clock signal of which the phase is locked to the horizontal synchronizing signal of input television signal, is to be used as a clock signal for the signal processing circuit. The clock generator 61 of FIG. 7 generates a clock signal of which the phase is locked to the horizontal synchronizing signal of input television signal.

When the decision circuit 62 so decides that the input television signal is a standard television signal, switches 74 and 75 are controlled to select outputs Y and C of the YC separating circuit 63. Structure of the YC separating circuit 63 is the same as the one shown in FIG. 4.

When the decision circuit 62 so decide that the input television signal is a non-standard television signal, switches 74 and 75 are controlled to select outputs Y' and C' of the YC separating circuit 63'. In this case, a luminance signal Y' is picked up by a low-pass filter 76 from the input television signal and a modulated color signal C' is picked up by a band-pass filter 77. In the case of non-standard signals such as of a household video tape recorder, there exists no such an offset relationship that the phase of the color subcarrier signal is inverted between the lines. Therefore, the YC separation is effected by the line processing using simply a low-pass filter or a band-pass filter.

Figure 8:
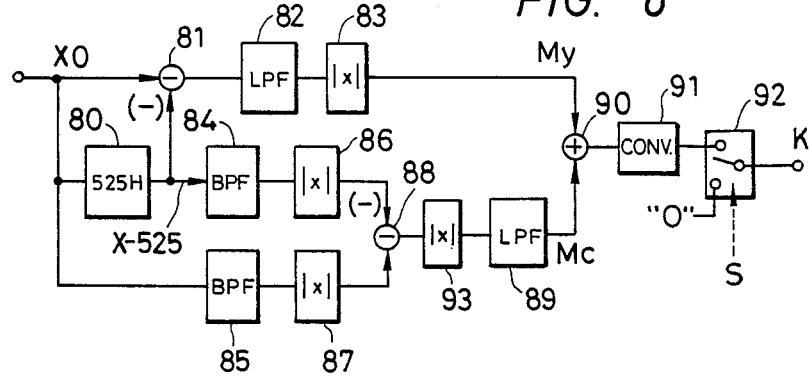
FIG. 8 is a diagram showing the structure of a motion detector circuit 64 of FIG. 6 according to an embodiment of the present invention.

When the input color television signals are those sent from a household video tape recorder, a signal before the frame period or the field period is not utilizable since there exists a jitter in the time axis. This can be realized by setting the motion coefficient k to "0" (motion picture mode). FIG. 8 illustrates the structure of the motion detecting circuit 6 according to an embodiment. A motion data signal My of a low-frequency component of a brightness signal is obtained by finding an absolute signal of a low-frequency component having a frame difference from an input color television signal $X_O$ and a signal $X_{-526}$ delayed by a frame memory 80, using a subtracting circuit 81, a low-pass filter 82 and an absolute circuit 83. On the other hand, an absolute frame difference signal of a component of a modulated color signal band is obtained through band-pass filters 84 and 85, absolute circuits 86 and 87, and a subtracting circuit 88. If this signal is demodulated by an absolute circuit 93 and a low-pass filter 89, there is obtained a motion data signal Mc of a color difference signal. The two signals are added up together through an adder circuit 90, and the added signal is converted by a converter circuit 91 into a motion coefficient k. When the input signal is a non-standard signal such as the one sent from a household video tape recorder, the motion coefficient is forcibly caused to assume "0" being controlled by a decision signal S (mentioned later), and the YC separating circuit 63 and, as required, the scanning line interpolation circuit 65 are rendered by a switching circuit 92 to assume the inter-field processing mode.

Figure 9:
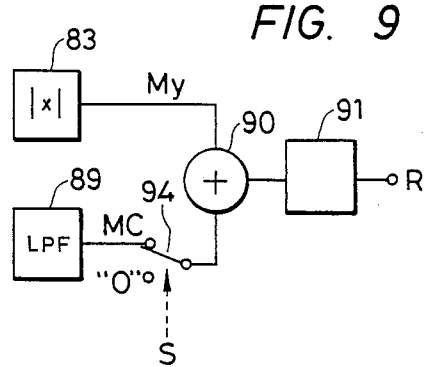
FIG. 9 is a diagram showing the structure of a motion detector circuit 64 of FIG. 6 according to a further embodiment of the present invention.

FIG. 9 is a circuit diagram of the motion detecting circuit 64 according to another embodiment, which has modified the structure of the output side on the right side of blocks 83, 89 of FIG. 8. The input side of the above blocks is the same as that of FIG. 8, and is not diagramed. The absolute circuit 83 produces a motion data My of a low-frequency component of a brightness signal, and a low-pass filter 89 produces a motion data Mc of a color difference signal. When the input television signal is a standard television signal, a switch 94 is connected to the upper side due to an output signal of the decision circuit 62, and an adder 90 produces a sum of signals My and Mc, which will be converted into a motion coefficient by a converter circuit 91. When the input television signal is a non-standard signal, the modulated color signal does not have a condition that the polarity is inverted between the frames, and it is not allowed to use the motion data Mc. Therefore, the switch 94 is connected to the lower side by the decision signal S of a non-standard signal, so that the signal Mc input to the adder circuit 90 is forcibly caused to assume the value "0" (no motion).

When a clock signal is to be locked in phase to the horizontal scanning period of the input television signals, position remains always constant relative to the picture of each of the picture elements despite the presence of change jitter in the time axis. Therefore, the jitter components are cancelled. Therefore, attention needs simply be given to the fact that the phase of the modulated color signal is not establishing an offset relationship between the lines. Therefore, the YC separation is performed by the interline processing, the motion coefficient is picked up by a frame difference signal of a low-frequency component of the brightness signal, and the scanning line interpolation of the motion-adaptive type can be performed using a field memory like the case of the standard television signals.

Figure 10:
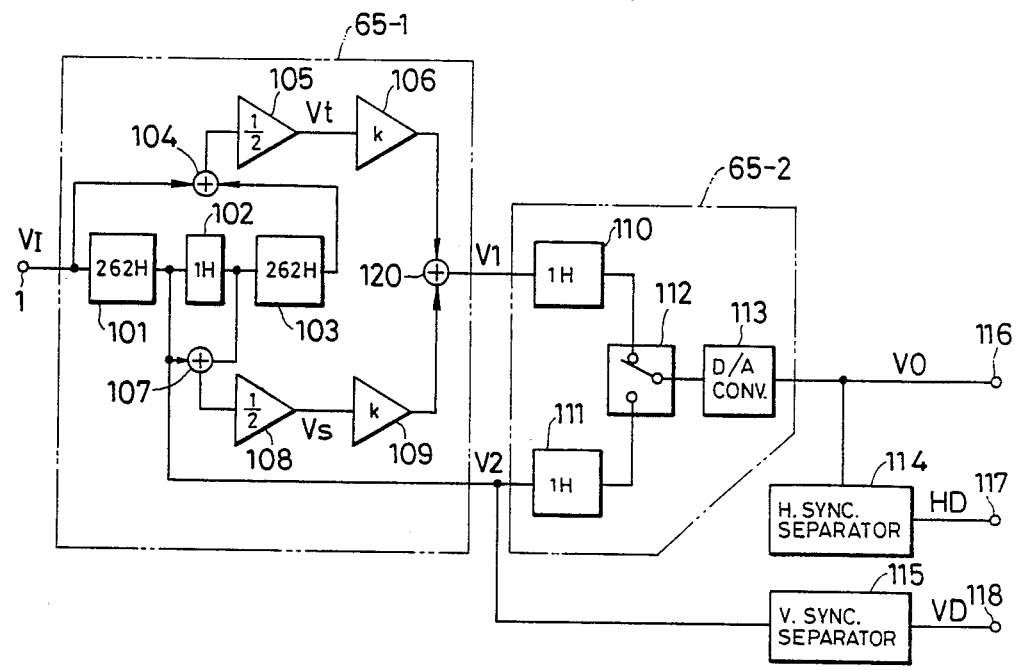
FIG. 10 is a circuit diagram of the scanning line interpolation circuit of FIG. 6 according to an embodiment of the present invention.

FIG. 10 illustrates the structure of the motion-adaptive scanning line interpolation circuit 65 according to another embodiment. In FIG. 10, the signal processing circuit consists of a signal processing circuit 65-1 which obtains a first signal $V_1$ of an interpolated scanning line from the input television signal $V_I$ and obtains, from the input television signal $V_I$, a second signal $V_2$ that is delayed by 262H (H denotes a horizontal scanning period) that is nearly equal to a vertical scanning period, and another signal processing circuit 65-2 which compresses the first and second signals $V_1$ and $V_2$ into one-half in time, and obtains a time-multiplexed output television signal $V_O$ with the scanning line as a unit. In the signal processing circuit 65-1, the input television signal $V_I$ is input to delay circuits 101, 102 and 103 that have delay times of 262H, 1H and 262H, respectively, and that are connected in cascade, and an average value Vt of signals delayed by one frame (525H) with respect to the signal $V_I$ is obtained through an adder circuit 104 and a coefficient circuit 105. Further, an average value Vs of input and output signals of the delay circuit 102 having a delay time of 1H is obtained through an adder circuit 107 and a coefficient circuit 108. The two average value signals $T_t$ and $V_s$ are mixed through coefficient circuits 106, 109 and an adder circuit 120, and the mixing ratio is controlled by a motion coefficient k ($0 \leq k \leq 1$) which represents a motion data of a subject picked up by a motion detecting circuit (not shown). The first television signal V₁ which is a signal of the interpolated scanning line is given by, $$V_1 = kV_t + (1-k)V_s$$

The second signal V₂ is the one that is obtained by delaying the input television signal by 262H through the delay circuit 101. In the signal processing circuit 65-2, the two signals V₁ and V₂ are input to memories 110 and 111 each having a capacity of 1H, and are read out at a doubled speed to compress the time into one-half. Then, a switching circuit 112 is switched into the scanning line unit, and the signals are returned through a digital-to-analog circuit back to analog television signals. Then, an output signal $V_O$ to be supplied to the display device is obtained from the terminal 116.

When the input TV signal $V_I$ is a non-standard television signal such as of a video tape recorder having large jitter, the aforementioned motion coefficient k is forcibly caused to assume O. Therefore, a signal $V_t$ which is an average value of scanning lines of the preceding and succeeding fields, is no more utilizable, and an average value $V_s$ of upper and lower scanning lines that are close in time to each other, is produced as the signal V₁. Therefore, an average signal of the upper and lower displayed scanning lines is displayed as a picture. The synchronizing signal works to correctly display the above signal on the display unit. However, since the signal V₁ consists of an average value of the upper and lower scanning lines, the waveform of the vertical synchronizing signal is disturbed, and it becomes difficult to pick up the vertical synchronizing signal. The embodiment of FIG. 10 is to solve this problem. Namely, the horizontal synchronizing signal HD only is separated from the output signal $V_O$ by the synchronizing signal separating circuit 114, and the vertical synchronizing signal VD is separated by the first synchronizing signal separating circuit 115 from the second output signal V₂ of the signal processing circuit 65-1. The signal V₂ is the one that is obtained by simply delaying the input TV signal $V_I$ by the vertical scanning period. Therefore, no disturbance is contained in the vertically synchronized portion, and the vertically synchronizing signal VD can be easily picked up.

Figure 11:
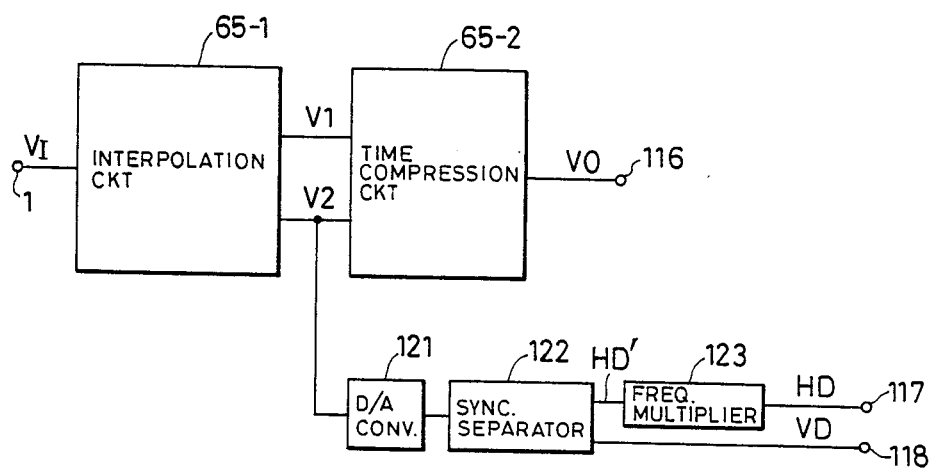
FIG. 11 is a diagram showing the structures of a scanning line interpolation circuit, and a vertical and horizontal synchronizing signal separating circuits of FIG. 6 according to another embodiment of the present invention.

FIG. 11 illustrates a signal processing circuit similar to that of FIG. 10 to pick up synchronzing signals according to a further embodiment. The second signal V₂ of the signal processing circuit 65-1 which is delayed is returned back to the analog through the digital-to-analog converter circuit 121, and the horizontal synchronizing signal HD' and the vertical synchronizing signal VD are separated by the synchronizing signal separating circuit 122. If the signal HD' is double-scanned by a frequency multiplying circuit 123, there is obtained a desired horizontal synchronizing signal HD.

When the circuit of FIG. 10 or 11 is used as the circuit 65 of FIG. 6, the input signal $V_I$ is a luminance signal that is separated. The input signal $V_I$, however, may be a composite television signal that contains a synchronizing signal, or may be a component signal of red (R), blue (B) and green (G) that contains a synchronizing signal.

When the input television signal $V_I$ consists of an analog signal, furthermore, the analog-to-digital converter must be provided.

In the embodiment of FIG. 10, the horizontal synchronizing signal HD is picked up from the output side of the digital-to-analog converter circuit 113. However, it is also allowable to digitally separate it from the input side of the digital-to-analog converter circuit 113. When the signal is digitally extracted, however, jitter easily takes place in the horizontal direction due to distortion caused by the sampling. In the case of the vertical synchronizing signal VD having a long period, effect of jitter by the sampling can be neglected, and the synchronizing signal separating circuit 115 may be made up of a digital circuit.

What is claimed is:

1. A television signal processing circuit comprising:
   (1) an input means for receiving a television signal;
   (2) a first signal processing circuit which includes a video memory having a delay time substantially equal to a vertical scanning period of the television signal or to an integer multiple thereof, to at least separate a luminance signal and a chrominance signal of the video signal or to interpolate the scanning line;
   (3) a second signal processing circuit without a video memory, being arranged in parallel with said first signal processing circuit and being responsive to said television signal; and
   (4) selecting means, in response to a television signal to be processed which does not conform with the standard color television signal, selecting the output of said second signal processing circuit.

2. A television signal processing circuit according to claim 1, wherein said selecting means comprises:
   a decision circuit which decides whether or not the television signal fed into said input means is the standard color television signal; and
   a switching circuit which selects the output of said first signal processing circuit or the output of said second signal processing circuit in response to an output signal of said decision circuit which is indicative of the type of color television signal present.

3. A television signal processing circuit according to claim 1, wherein said selecting means comprises:
   a coefficient generating circuit which generates a coefficient that corresponds to the motion data of the television signal;
   a coefficient multiplying circuit which combines the output of said first signal processing circuit or the output of said second signal processing circuit; and
   a coefficient controlling circuit which, when the television signal to be processed is not the standard television signal, forcibly sets the coefficient of the output of said coefficient generating circuit to a predetermined value.

4. A television signal processing circuit according to claim 1, wherein said input unit has a clock signal generating circuit which generates clock signals of having a phase locked to the horizontal synchronizing signals of the input television signals.

5. A television signal processing circuit according to claim 1, wherein said input unit has a clock signal generating circuit which generates clock signals having a phase locked to the color burst signals of the input color television signals.

6. A television signal processing circuit according to claim 1, further comprising deflecting signal generating unit for at least separating a horizontal synchronizing signal from the output of said selecting means.

7. A television signal processing circuit having an input means to convert a color television signal into a digital signal, a luminance-chrominance (YC) separating circuit which receives the digital color television signal produced by said input unit and separates it into a luminance signal and a modulated color signal, a scanning line interpolation circuit which converts the output of said separating circuit into a signal of which the number of scanning lines is doubled, and a display device which converts the output signal of said scanning line interpolation circuit into an analog signal and displays it on a display, wherein;

said YC separating circuit has a first mixing circuit which obtains a modulated color signal separated from the luminance signal by mixing a first modulated color signal obtained from a difference signal between frames of the input color television signals and a second modulated color signal obtained by a intra/field processing;

said scanning line interpolation circuit comprises a first compressing circuit which directly compresses the time of the input signal which is fed into said line interpolation circuit, a second mixing circuit for mixing a signal obtained by averaging the signals that are separated apart by a period of one line and a signal delayed by a period of one field, a second compressing circuit which compresses the time of the above mixed and interpolated signal, and a switch which switches the outputs of said first and second compressing circuits at a period one-half the horizontal scanning period of the input color television signals;

and control means, in response to a non-standard television signal, for controlling said YC separating circuit such that it produces said second modulated color signal only, and wherein the second compressing circuit of said scanning line interpolation circuit receives only the signal that is obtained by averaging the signals which are separated apart by a period of one line.

8. A television signal processing circuit according to claim 7, said control means further including a motion detecting circuit which detects the motion of picture from the input color television signals, and wherein the mixing ratio of said first and second mixing circuits is controlled by the output of said motion detecting circuit.

* * * * *